L. H. SCURLOCK.
DIFFERENTIAL GEAR.
APPLICATION FILED NOV. 30, 1915.

1,196,988.

Patented Sept. 5, 1916.
5 SHEETS—SHEET 1.

Inventor
Lewis H. Scurlock.

Witnesses

By
Attorney

L. H. SCURLOCK.
DIFFERENTIAL GEAR.
APPLICATION FILED NOV. 30, 1915.

1,196,988.

Patented Sept. 5, 1916.
5 SHEETS—SHEET 2.

Witnesses

Inventor
Lewis H. Scurlock.
By Goodwin B. Smith
Attorney

L. H. SCURLOCK.
DIFFERENTIAL GEAR.
APPLICATION FILED NOV. 30, 1915.

1,196,988.

Patented Sept. 5, 1916.
5 SHEETS—SHEET 4.

Witnesses

Inventor
Lewis H. Scurlock.
By
Attorney

L. H. SCURLOCK.
DIFFERENTIAL GEAR.
APPLICATION FILED NOV. 30, 1915.

1,196,988.

Patented Sept. 5, 1916.
5 SHEETS—SHEET 5.

Inventor
Lewis H. Scurlock.

By
Goodwin D. Smith
Attorney

Witnesses.

ced Sept. 5, 1916.
UNITED STATES PATENT OFFICE.

LEWIS H. SCURLOCK, OF DETROIT, MICHIGAN, ASSIGNOR, BY MESNE ASSIGNMENTS, TO WILLIAM H. HOLDEN, OF DETROIT, MICHIGAN.

DIFFERENTIAL GEAR.

1,196,988. Specification of Letters Patent. Patented Sept. 5, 1916.

Application filed November 30, 1915. Serial No. 64,305.

*To all whom it may concern:*

Be it known that I, LEWIS H. SCURLOCK, a citizen of the United States, residing at Detroit, in the county of Wayne and State of Michigan, have invented certain new and useful Improvements in Differential Gear, of which the following is a specification.

My invention relates broadly to gearing and has particular reference to improvements in differential gears for automobiles or other vehicles.

An important object of the invention is to improve, in general, the construction of differential gears, with a view of simplifying the same and reducing the number of working parts to the minimum.

A further object of the invention is to provide a differential gear of the above mentioned character, embodying floating gear or gears, whereby the shafts or spindles for the gears in the ordinary differential gear are dispensed with.

A further object of the invention is to provide a differential gear of the above mentioned character, having floating planetary gear or gears, operating without shafts or spindles, whereby these gears and portions of the planetary gear carrier are not drilled for receiving the shafts or spindles, and the strength of the differential gear as a whole substantially increased and the cost of manufacture reduced.

A further object of the invention is to provide means of the above mentioned character, the elements of which are arranged in a highly compact manner, and may be assembled conveniently and expeditiously.

A further object of the invention is to provide apparatus of the above mentioned character, parts of which are so arranged that they may be thoroughly lubricated and retained properly lubricated for a prolonged period, without further attention.

Other objects and advantages of the invention will be apparent during the course of the following description.

Figure 1:
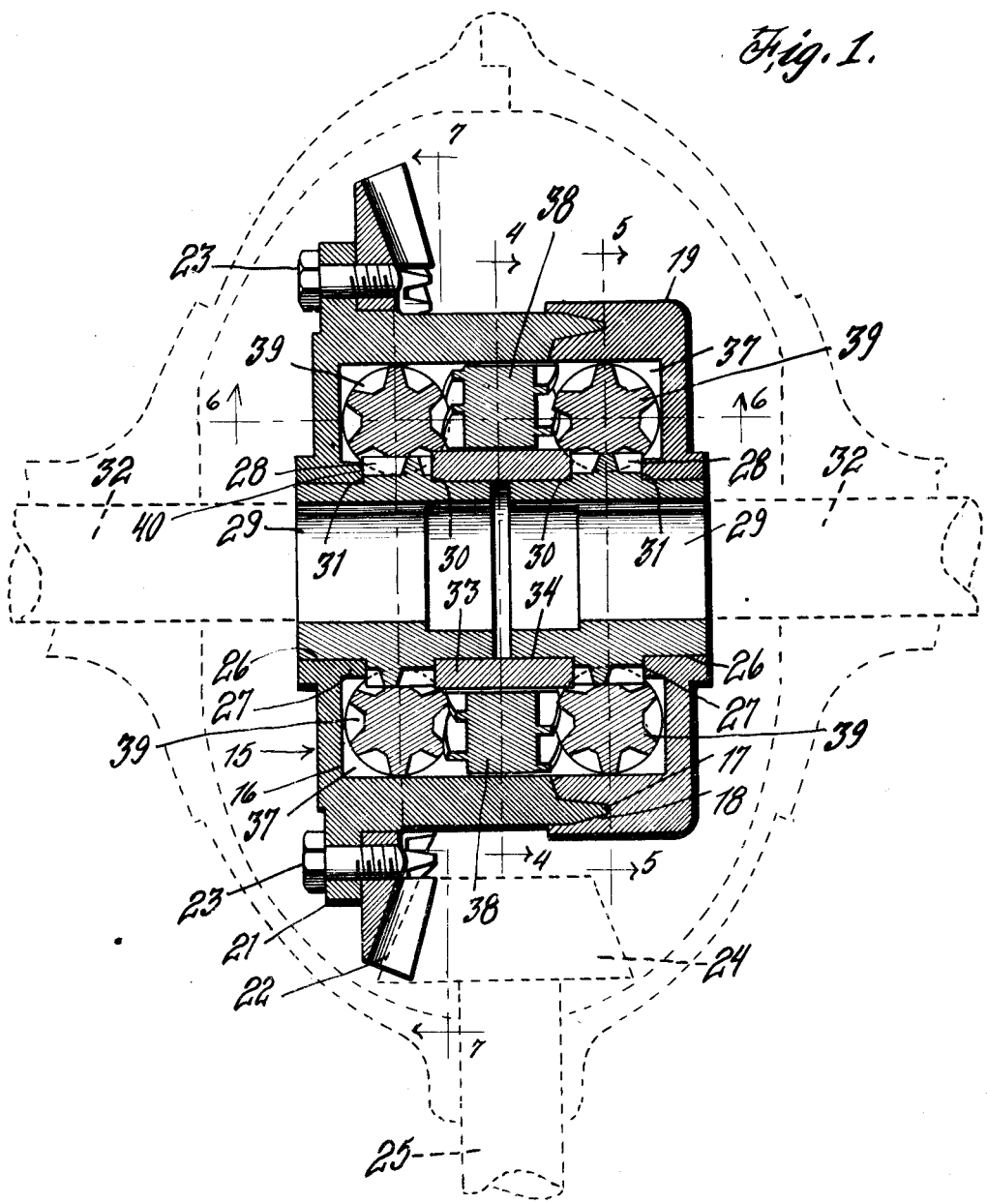
Figure 3:
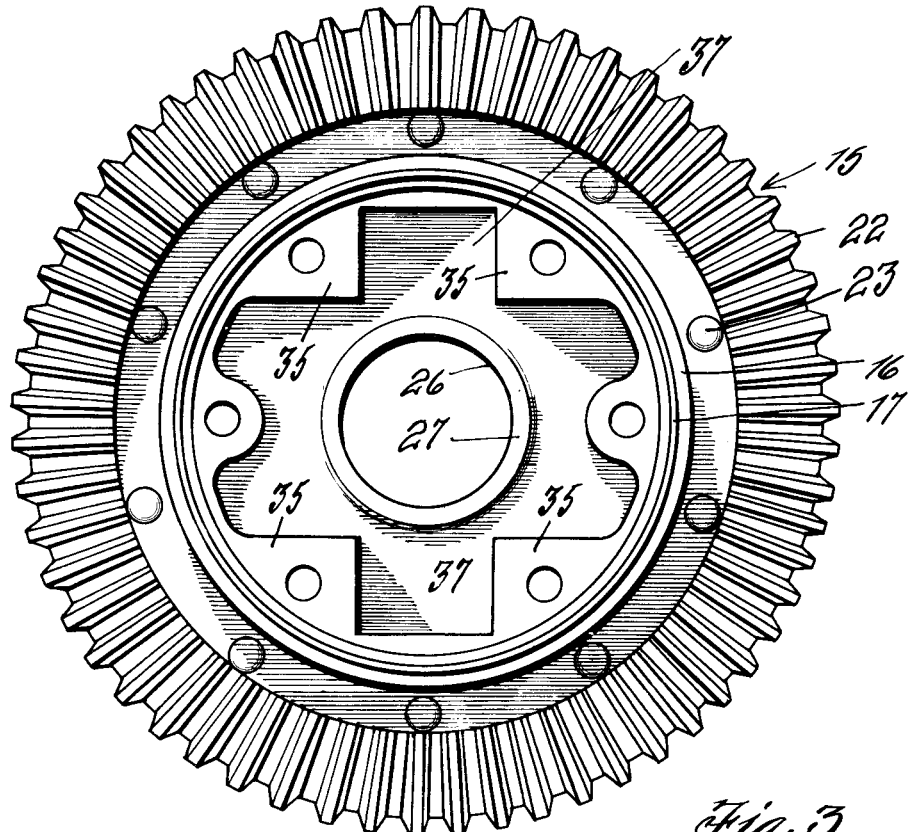
Figure 2:
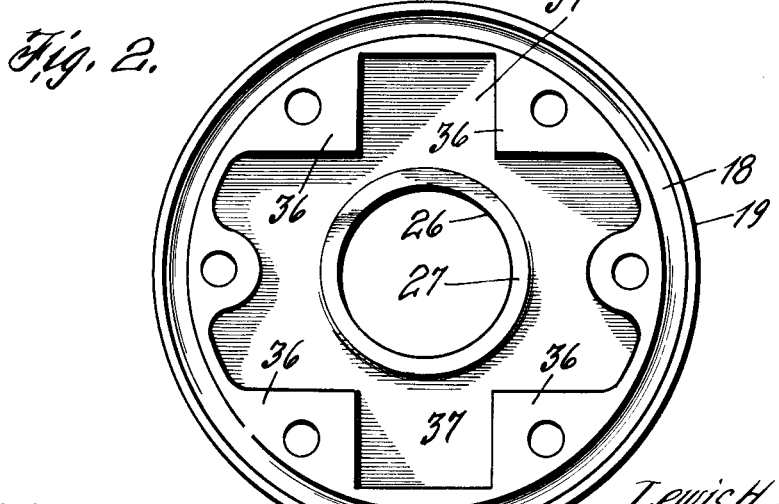
Figure 4:
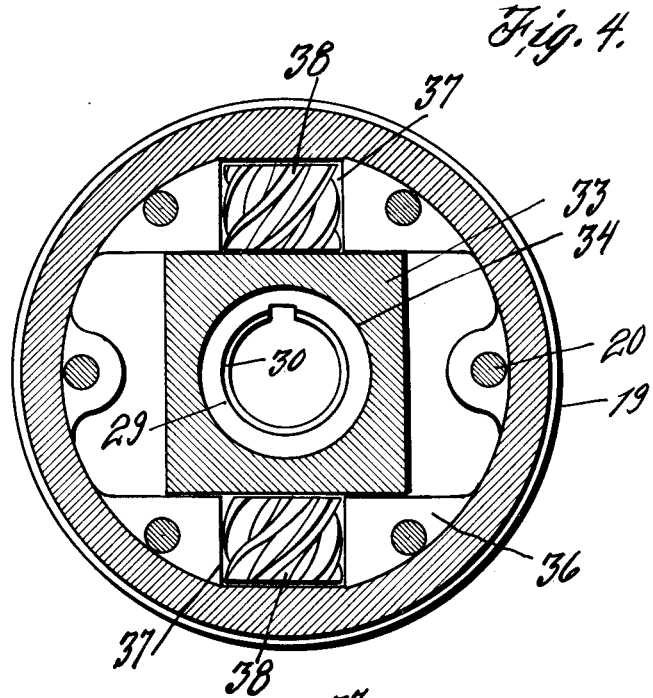
Figure 5:
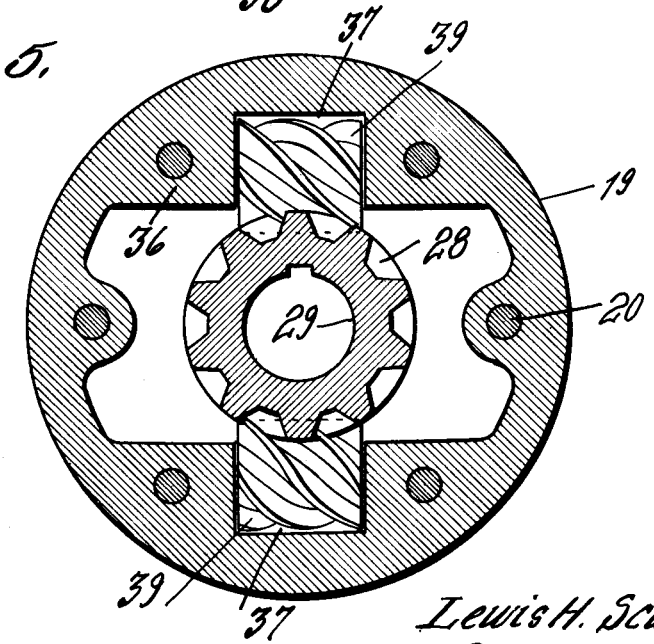
Figure 6:
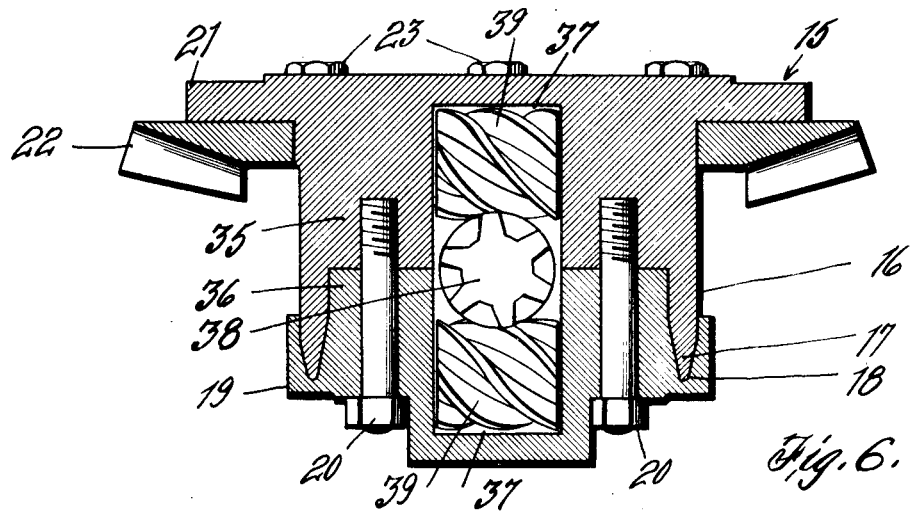
Figure 7:
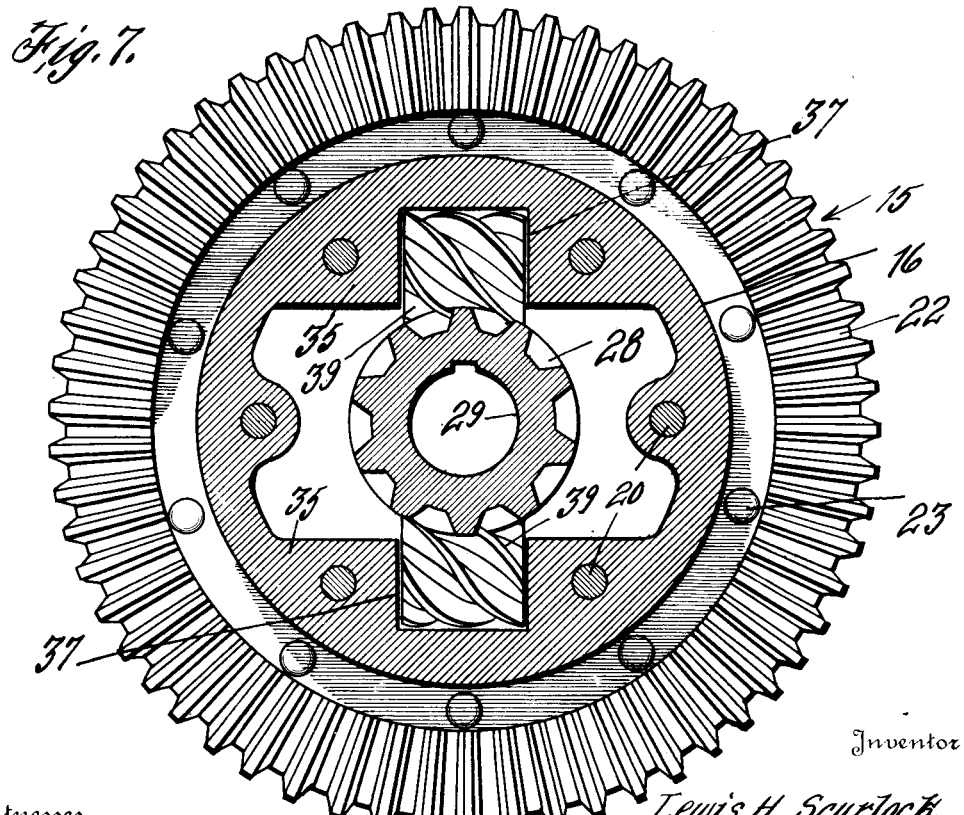
Figure 8:
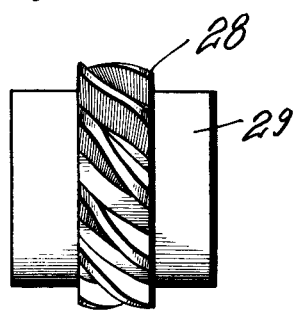
Figure 11:
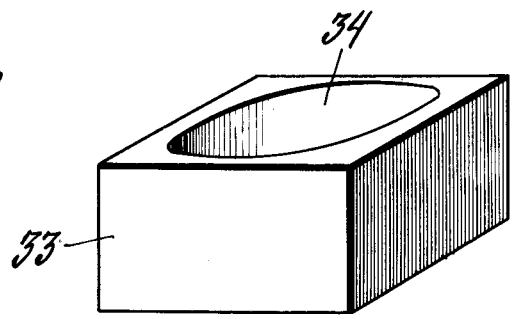
Figure 9:
Figure 10:
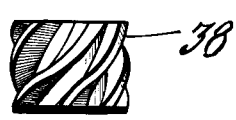
Figure 12:
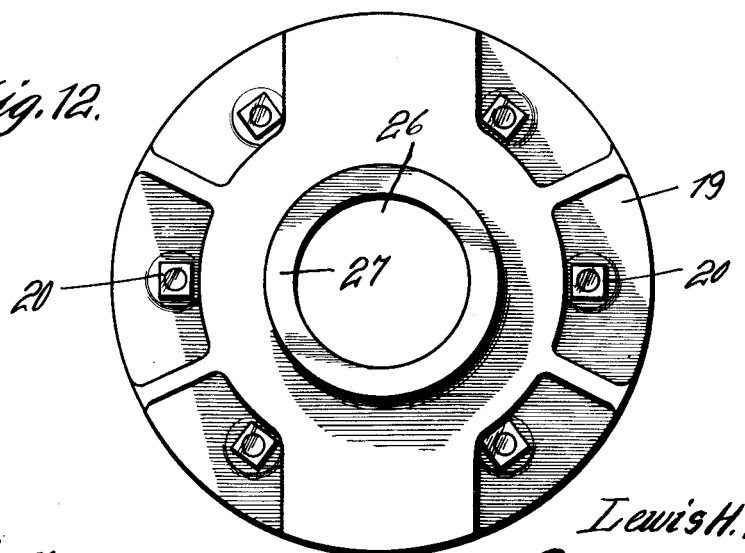

In the accompanying drawings forming a part of this specification and in which like numerals are employed to designate like parts throughout the same, Figure 1 is a central longitudinal horizontal sectional view through a differential gear embodying my invention, Fig. 2 is an elevation of the inner face or side of the body portion of the planetary gear carrier or casing, Fig. 3 is a similar view of a cap, or end, included in the planetary gear carrier or casing. Fig. 4 is a transverse sectional view taken on line 4—4 of Fig. 1, Fig. 5 is a similar view taken on line 5—5 of Fig. 1, Fig. 6 is a horizontal sectional view taken on line 6—6 of Fig. 1, Fig. 7 is a transverse vertical sectional view taken on line 7—7 of Fig. 1, Fig. 8 is a side elevation of an axle section driving worm gear, Fig. 9 is a similar view of a planetary worm gear, Fig. 10 is a similar view of a different planetary worm gear, Fig. 11 is a perspective view of a spacing element or block, and, Fig. 12 is an elevation of the outer end of the cap or head of the differential gear carrier or casing.

In the drawings, wherein for the purpose of illustration is shown a preferred embodiment of my invention, the numeral 15 designates a planetary gear carrier or casing, as a whole, constituting the body portion of the differential gear. This planetary gear carrier or casing comprises an approximately cup-shaped portion or casing 16, having an annular flange 17, at its open end, for fitting snugly within an annular groove 18, formed in a cap or end 19, included in the differential gear carrier. This cap or end is rigidly secured to the body portion or casing 16 by bolts 20, as shown, while other suitable means may be employed. As more clearly shown in Figs. 1 and 2, the cup-shaped body portion or casing 16 is provided at one end and upon its periphery with an annular flange 21, having contact with an annular beveled gear 22, rigidly secured thereto by means of bolts 23 or the like. The gear 22 receives its rotation from a beveled gear 24, connected with the shaft 25, driven from the crank shaft of the engine, preferably through the medium of a friction clutch mechanism, as is customary.

The cup-shaped body portion 16 or casing and the cap or end 19 are provided centrally thereof with cylindrical horizontal openings 26, having outer reduced portions, for providing shoulders 27, as shown.

The numeral 28 designates axle driving worm gears, having tubular hubs 29. These tubular hubs have reduced inner and outer portions, forming shoulders 30 and 31. The worm gears 28 are arranged for rotation within the openings 26, and their shoulders 31 are adapted to contact with the shoulders 27, thus preventing outward longitudinal movement of these gears with relation to the planetary gear carrier. The tubular hubs 28 receive the inner ends of rear axle sections 32, which are keyed thereto, or otherwise rigidly attached thereto, for rotation therewith. It is obvious that the worm gears 28 are adapted for independent rotation with relation to each other.

Arranged between the worm gears 28 is a preferably square spacing element or block 33, having a cylindrical horizontal opening 34, pivotally receiving the reduced inner ends of the tubular hubs 29, and contacting with the inner shoulders 30 thereof. The spacing element or block 33 cannot rotate with relation to the planetary gear carrier, as it contacts with spaced fillers or castings 35, arranged within the casing 16 and formed integral therewith, as more clearly shown in Figs. 2 and 4.

The numeral 36 designates spaced fillers or castings, formed within the cap or end 19 and adapted, when the cap is placed in position upon the casing 16, to be in alinement with the fillers 35, and to contact with the spacing element or block 33.

The casing 16 and cap 19 are provided between their fillers with radially disposed recesses or chambers 37, within the central portions of which are disposed inner radially disposed floating worm gears 28, as more clearly shown in Figs. 1 and 6. These worm gears have no shafts or studs to turn upon, but are held in place by slidably contacting with the walls of the recesses or chambers 37 and the block 33, and further by engagement with outer floating planetary worm gears, to be described. Arranged upon opposite sides of the floating worm gears 38 are outer floating planetary worm gears 39, engaging therewith, and slidably mounted in the opposite ends of the recesses or chambers 37. These floating worm gears 39 have no axles or shafts to turn upon, but are held in place by slidable contact with the walls of the recesses or chambers 37 and by engagement with other gears or worm gears. The recesses or chambers 37 have openings 40, receiving the teeth of the worm gears 28, which mesh with the outer planetary worm gears 39, as shown.

From the foregoing description it is apparent that I have provided a differential gear, comprising planetary gears which are held in place within or upon the planetary gear carrier without the employment of shafts, studs or the like. The recesses or chambers which receive the floating worm gears, being substantially rectangular in cross-section, afford spaces at their corners for receiving and holding a suitable lubricant.

In assembling the different elements of the differential gear, the casing 16 is preferably horizontally arranged and the hub 29 of the worm gear 28 inserted within the opening 26. The planetary worm gears 39 are then inserted within the ends of the chambers 37 formed in the casing 16. The spacing element or block 33 is placed upon the upper end of the tubular hub of the worm wheel 28. The radially disposed inner planetary worm gears 38 are placed in position, and the other pair of worm gears 39 placed thereon. The other worm wheel 28 has its hub inserted within the opening of the block 33, and the cap 19 is then placed upon the casing 16, the groove 18 receiving the flange 17. This cap is held in place by proper manipulation of its bolts.

In operation, the rotation of the beveled gear 24 drives the annular gear 22, causing the planetary gear carrier or casing 15 to rotate. This rotation of the planetary gear carrier, when both wheels of the automobile are equally free to rotate, is transmitted to the axle sections 32, whereby they turn with the planetary gear carrier, without the planetary gears revolving upon their axes. When the automobile is turning a curve, the outer rear wheel must travel faster than the inner rear wheel, and this difference in speed is automatically taken care of by the action of the planetary gears rotating upon their axes, during the rotation of the planetary gear carrier, as is well known in the operation of differential gears of this general type. By the employment of planetary worm gears instead of bevel gears, it has been found that one rear wheel cannot spin, but both wheels are driven together during the straight travel of the automobile.

It is to be understood that the form of my invention herewith shown and described is to be taken as a preferred example of the same, and that various changes in the shape, size, and arrangement of parts may be resorted to without departing from the spirit of the invention which is limited by the scope of the subjoined claims.

Having thus described the invention, I claim:—

1. In a differential gear, a planetary gear carrier having chambers formed therein, floating gears mounted to rotate within each chamber without the use of shafts and arranged at an angle with relation to each other, axle section driving gears engaging certain of the floating gears, and means to rotate the planetary gear carrier.

2. In a differential gear, a planetary gear carrier comprising a casing having chambers formed therein, floating planetary gears mounted to rotate within the chambers without the use of shafts and arranged at angles with relation to each other, axle section driving gears arranged within the casing and engaging certain of the planetary gears, and means to rotate the casing.

3. In a differential gear, a planetary gear carrier comprising a casing having chambers formed therein, floating planetary worm gears mounted to rotate within the chambers without the use of shafts and arranged at angles with relation to each other, axle section driving worm gears arranged within the casing inwardly of certain of the planetary worm gears and engaging therewith, and means to rotate the casing.

4. In a differential gear, a planetary gear carrier comprising a casing having chambers formed rectangular in cross-section, substantially cylindrical floating planetary worm gears mounted to rotate within said chambers without the use of shafts, axle driving worm gears engaging with certain of the planetary worm gears, and means to drive the casing.

5. In a differential gear, a planetary gear carrier comprising a casing provided at its ends with openings and having interior chambers, axle driving gears having hubs extending into the openings at the ends of the casing, floating planetary gears mounted to rotate in the chambers without the use of shafts and certain of the planetary gears engaging the first named gears, and means to rotate the casing.

6. In a differential gear, a planetary gear carrier comprising a casing provided at its ends with openings and having interior chambers, axle driving gears having hubs extending into the openings at the ends of the casing, a spacing element arranged within the casing and having an opening receiving the inner ends of the hubs of the axle driving gears, inner planetary gears arranged within the chambers for rotation without the use of shafts and slidably contacting with the spacing element, outer planetary gears mounted to rotate within the chambers upon opposite sides of the first named planetary gears without the use of shafts, and means to rotate the casing.

7. In a differential gear, a planetary gear carrier comprising a casing provided at its ends with openings and having interior chambers, axle driving gears having hubs extending into the openings at the ends of the casing, a spacing element arranged within the casing and having an opening receiving the inner ends of the hubs of the axle driving gears, inner planetary gears arranged within the chambers for rotation without the use of shafts and slidably contacting with the spacing element, and outer planetary gears mounted to rotate within the chambers upon opposite sides of the first named planetary gears without the use of shafts.

8. In a differential gear, a planetary gear carrier comprising a casing provided at its ends with openings and having interior chambers which are substantially rectangular in cross-section, axle driving worm gears mounted within the casing and having hubs with their outer ends extending into the openings at the ends of the casing, a spacing element having an opening to receive the inner ends of the hubs and disposed within the casing, inner radial floating planetary worm gears mounted within the chambers and having their inner ends slidably contacting with the spacing element, outer planetary worm gears mounted to rotate within the ends of the chambers without the use of shafts and disposed at substantially a right angle to the first named planetary worm gears and engaging therewith and with the axle driving worm gears, and means to rotate the casing.

9. In a differential gear, a planetary gear carrier comprising a casing provided at its ends with openings and having interior chambers, axle driving gears arranged within the casing and having hubs provided with inner and outer reduced portions forming inner and outer shoulders with the outer portions of the hubs projecting into the openings at the ends of the casing, a spacing block arranged in the casing and having an opening to receive the inner reduced portions of the hubs, inner radially disposed planetary floating gears disposed within the chambers for rotation without the use of shafts and having their inner ends slidably contacting with the spacing block, outer planetary floating gears disposed at an angle with relation to the first named planetary gears for engagement therewith and mounted to rotate in the ends of the chambers without the use of shafts, and means to drive the casing.

10. In a differential gear, a casing having recesses, a cap closing one end of the casing and having recesses adapted to register with the first named recesses and forming chambers therewith, floating planetary gears mounted to rotate within the chambers without the use of shafts, axle driving worm gears mounted to rotate within the casing and engaging with certain of the planetary gears, and means to rotate the casing.

11. In a differential gear, a casing having recesses, a flange formed upon the open end of the casing, a cap having a groove to receive the flange and provided with recesses to register with the first named recesses for forming chambers, bolts for securing the cap to the casing, floating planetary worm gears mounted to rotate within the chambers without the use of shafts, axle driving worm gears rotatably mounted within the casing and engaging certain of the floating gears, and a gear connected with the casing to drive it.

12. In a differential gear, a casing provided with an interior recess and having a tongue at one end and a radially extending flange at the other end, an annular gear surrounding the casing and bolted to the flange, a cap having a groove to receive the tongue of the casing and provided with an interior recess for registration with the first named recess to form therewith a chamber, planetary gears mounted to rotate within the chamber, and axle driving gears rotatably mounted within the casing and engaging with certain of the planetary gears.

13. In a differential gear, a casing provided at its ends with openings and having interior chambers, axle driving gears mounted within the casing and having tubular hubs to receive the axle sections with the outer ends of the hubs extending into the openings at the ends of the casing, floating planetary gears mounted for rotation within the chambers without the use of shafts and certain of the planetary gears engaging the axle driving gears, and a gear connected with the casing to drive it.

In testimony whereof I affix my signature in the presence of two witnesses.

LEWIS H. SCURLOCK.

Witnesses:
LOIS G. WAGONER,
C. C. McKINNEY.